May 2, 1961 R. E. SEELY Re. 24,977
CIRCUIT FOR MEASURING THE TEMPERATURE OR RESISTANCE CHANGE OF ENERGIZED ALTERNATING CURRENT APPARATUS
Original Filed July 25, 1955
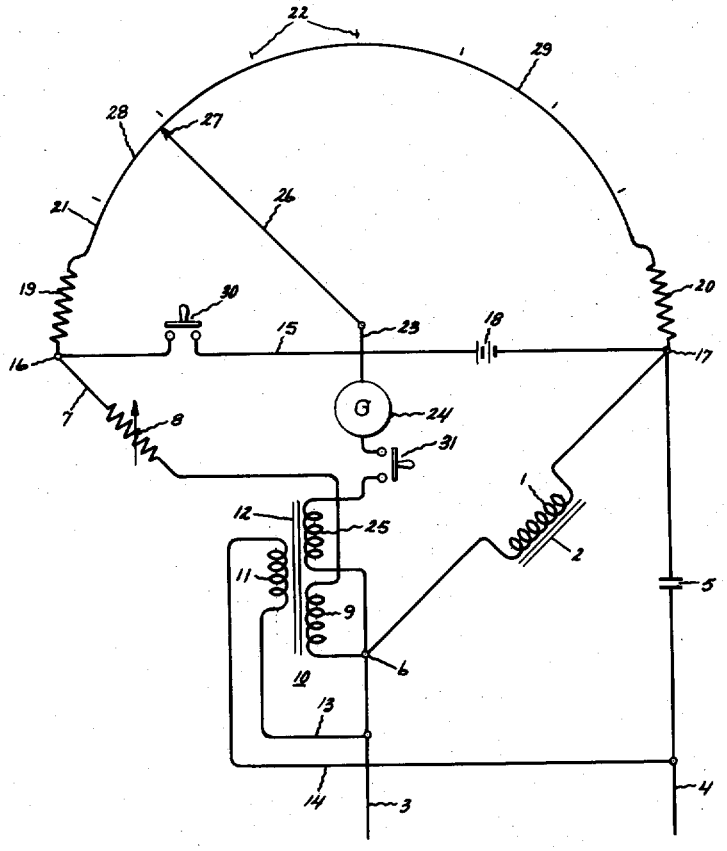
Inventor:
Richard E. Seely,
by Robert G. Gray
His Attorney.

United States Patent Office

Re. 24,977
Reissued May 2, 1961

24,977

CIRCUIT FOR MEASURING THE TEMPERATURE OR RESISTANCE CHANGE OF ENERGIZED ALTERNATING CURRENT APPARATUS

Richard E. Seely, Fort Wayne, Ind., assignor to General Electric Company, a corporation of New York Original No. 2,825,027, dated Feb. 25, 1958, Ser. No. 524,034, July 25, 1955. Application for reissue Nov. 3, 1960, Ser. No. 68,328

6 Claims. (Cl. 324—62)

Matter enclosed in heavy brackets [ ] appears in the original patent but forms no part of this reissue specification; matter printed in italics indicates the additions made by reissue.

This invention relates to temperature measuring devices, and more particularly to means for measuring the temperature or resistance change of energized alternating current apparatus.

It is frequently desirable to measure the temperature of an energized alternating current winding, such as a transformer winding or a motor stator winding, without de-energizing the winding. In the past, it has generally been necessary to approximate the temperature by measuring the winding resistance after the winding has been de-energized, which involves the necessity of securing a number of resistance readings at various time intervals after shutdown and the extrapolation of these readings back to zero time to ascertain the approximate resistance, and their temperature, of the winding at shutdown. In Patent 2,578,455, to the present inventor issued December 11, 1951, and assigned to the assignee of the present application, there is described a circuit which permits direct measurement of the resistance of energized alternating current apparatus in order to avoid the extrapolation described above. Even this circuit, however, does not provide a direct temperature reading but instead, it is necessary to utilize the resistance reading together with the resistance at room temperature and the known temperature coefficient of resistivity of the material of which the apparatus is composed. This in turn requires additional computations after the resistance is determined in order to ascertain the temperature. It is most desirable to eliminate not only the extrapolation required when the resistance is measured after the winding has been de-energized, but also the necessity of converting the resistance change into temperature change, and to provide simple and economical apparatus which will give a direct reading of temperature for energized alternating current apparatus.

It is, therefore, an object of this invention to provide an improved circuit which will include the desirable features set forth above.

Further objects and advantages of this invention will become apparent and the invention will be better understood from the following description referring to the accompanying drawing, and the features of novelty which characterize this invention will be pointed out with particularity in the claims annexed to and forming a part of this specification.

In accordance with one aspect of this invention, there is provided a circuit for measuring the temperature or resistance change of alternating current apparatus while it is connected across a source of alternating current power which includes a Wheatstone bridge adapted to be connected to the apparatus so that in effect the apparatus will be one branch of the bridge. The bridge further comprises a first conductor which includes a variable resistance and which is adapted to be connected in series with the apparatus. A second conductor is adapted to be connected across the first conductor and the apparatus, and a calibrated resistance is also adapted to be connected across the first conductor and the apparatus. A third conductor is adapted to be connected at one end to the junction of the first conductor and of the apparatus and has its other end movably connected to the calibrated resistance intermediate the ends thereof. One of the second and third conductors has a source of direct current connected therein, and the other of the second and third conductors has current detecting means connected therein. A transformer has its primary winding adapted to be connected across the source of alternating current power; a first secondary winding is arranged in the first conductor in series with the variable resistance, and a second secondary winding is arranged in the third conductor. The secondary windings are arranged to develop voltages thereacross which are respectively substantially equal to and *180 degrees out of* [in] phase with the voltage across the apparatus. Also, direct current blocking means are connected in the circuit so as to block the direct current from traveling outside the circuit.

Before testing, the temperature of the motor winding is measured. The movable end of the third conductor is then positioned on the calibrated resistance at the temperature reading of the cold winding. The variable resistance is then adjusted until the current detecting means shows that the bridge is balanced. To measure the temperature of the energized winding, it is then merely necessary to move the movable end of the third conductor along the calibrated resistance until the current detecting means again shows that the bridge is balanced. This, in effect, is determined by the change in resistance of the energized apparatus which comes about as a result of the change in temperature. This is a linear relationship in the temperatures in which most electrical apparatus operates. For a given material, such as copper or aluminum, the calibrated resistance may be provided with direct temperature readings so that the positioning of the movable end of the third conductor will immediately give the correct temperature of the energized alternating current apparatus. It will, of course, be seen that the calibrated resistance may be set up to show the ratio of resistance when energized to cold resistance rather than temperature if so desired.

In the drawing, the single figure is a schematic illustration of the improved circuit of this invention.

Referring now to the figure of the drawing, there is shown a winding 1 of electrical apparatus (not shown) such as, for instance, a motor or a transformer which may be provided with a core member such as that schematically indicated at 2. Winding 1 is connected across a pair of lines 3 and 4 which connect the winding across a source of alternating current power (not shown). Line 4 includes a capacitor 5 for a purpose hereinafter to be explained. Connected in series with winding 1 at point 6 is a conductor 7 which includes a variable resistor 8 and, in series therewith, the secondary winding 9 of a transformer, generally indicated at 10, having a primary winding 11 and a core 12. Primary winding 11 is connected across lines 3 and 4 by means of lines 13 and 14 respectively. A conductor 15 is connected across conductor 7 and winding 1 at points 16 and 17 respectively, and includes a battery 18 as a source of direct current power for a purpose to be explained herebelow. Conductor 15 also may include circuit breaking means, such as, for instance normally open push-button switch 30. Connected in series with conductor 7 and winding 1 respectively at points 16 and 17 respectively are a pair of resistances 19 and 20 which are connected together by a resistance 21 calibrated as shown at 22 to provide direct temperature readings. A third conductor 23 is connected at one end to point 6 which constitutes the junction between conductors 7 and coil 1. Conductor 23 includes in series therewith current detecting means such as, for instance, galvanometer 24, and secondary winding 25 of transformer 10. As with conductor 15, conductor 23 may be provided with circuit breaking means such as normally open push button switch 31. The end of conductor 23 is a movable member or pointer 26 whose end 27 is connected in conductive relationship with resistance 21. In effect, pointer 26 of conductor 23 defines two variable portions 28 and 29, portion 28 consisting of resistance 19 and part of resistance 21, and portion 29 consisting of resistance 20 and the remainder of resistance 21.

Coil 1, conductor 7, portions 28 and 29, conductor 15 and conductor 23 constitute together the six branches of a Wheatstone bridge. It is well known, as set forth in section 2—30 on pages 65 and 66 of the 1933 impression of the sixth edition of the Standard Handbook for Electrical Engineers (McGraw-Hill) that when no current flows through conductor 23 the bridge is said to be balanced, and the condition holds that the resistance of conductor 7 times the resistance of portion 29 equals the resistance of coil 1 times the resistance of portion 28. This in turn means that the resistance of coil 1 is to the resistance of conductor 7 as the resistance of portion 29 is to the resistance of portion 28. Thus, for a given resistance of coil 1 and a given position of pointer 26 of conductor 23, variable resistance 8 can be varied to make the bridge balance and galvanometer 24 will show that no current is passing through conductor 23.

A necessary preliminary step to measurement of the temperature of the energized winding 1 is determining the temperature of winding 1 at room temperature before it is energized by any desired means, such as placing a thermometer in proximity with the winding. Pointer 26 is then placed so that the end 27 of the pointer is on that part of calibrated resistance 21 which corresponds to the temperature of winding 1. Variable resistor 8 is then adjusted until, with switches 30 and 31 closed, galvanometer 24 shows that no current is passing through conductor 23.

As the temperature of most conductive materials rises, the conductivity of those materials decreases, that is, their resistance increases. This relationship is a linear one in those temperatures where operation of most electrical apparatus is carried on insofar as those materials normally used for conductive purposes, such as copper and aluminum, are concerned. For instance, the resistance of copper has been found to increase about .00393 ohm/° C./ohm over a broad range. It therefore is possible to determine the temperature from a change in resistance of a conductor of known composition provided the original temperature is known. When the circuit of Figure 1 is used with winding 1 energized across lines 3 and 4, the temperature of the winding will be higher than the original temperature. As stated, the ratio of the resistance of winding 1 to the resistance of conductor 7 is equal to the ratio of the resistance of portion 29 to the resistance of portion 28 when the galvanometer reading is zero. An increase in the resistance of winding 1, therefore, will require that pointer 26 be moved to the left (as viewed in the figure) until, with the switches 30 and 31 closed, galvanometer 24 shows that the ratio of portion 29 to portion 28 is again the same as that of winding 1 to conductor 7. It will be seen that due to the linear nature of the variation of resistance with respect to temperature, resistance 21 may be calibrated directly in temperature so that once pointer 26 has been moved to re-establish balance of the bridge, the new temperature of the energized winding 1 may be read directly at a glance at the position of pointer 26 relative to calibrated resistance 21.

It is, however, necessary to preclude the alternating current voltage used to energize winding 1 from entering the bridge since the relatively delicate direct current apparatus would be destroyed and the bridge would be burned out. For this reason, secondary windings 9 and 25 are each in a one-to-one ratio with primary winding 11 so that the voltage across each secondary is substantially the same as the voltage across the line. In addition, it is desirable that the two secondary windings be *180 degrees out of* [in] phase with each other and with winding 1. By providing the two secondary windings in this manner, the voltages from winding 9 and winding 1 will buck each other out and prevent any line voltage from passing through conductor 15. Also, the combination of winding 9 and winding 1 with winding 25 causes the alternating current voltages to cancel each other out and be substantially eliminated in conductor 23 so as to protect the galvanometer 24. In this manner, the alternating current voltages of the line are arranged to buck each other out in the bridge circuit to leave substantially nothing but the direct current from battery 18.

To prevent the direct current from battery 18 from traveling back through lines 3 and 4, direct current blocking means such as capacitor 5 is connected in one of the lines, so that in effect the direct current is restricted to a circuit within the bridge and will not be affected by anything in the circuit connected across the alternating current source beyond the capacitor.

It will be seen from the foregoing that this invention provides a circuit by means of which the temperature of an energized alternating current winding may be quickly and simply determined. It will be further understood that the circuit of this invention is susceptible of many modifications which do not depart from the invention. For instance, the location of the source of direct current and of the direct current detecting means may be reversed and the bridge will function in the same manner to give the same general results.

It will therefore be apparent that while the invention has been explained by describing a particular embodiment thereof, improvements and modifications may be made without departing from the scope of the invention as defined in the appended claims.

What I claim as new and desire to secure by Letters Patent of the United States is:

1. A circuit for measuring the temperature or resistance change of alternating current apparatus while it is connected across a source of alternating current power comprising a first conductor including a variable resistance adapted to be connected in series with said apparatus, a second conductor adapted to be connected across said first conductor and said apparatus, a calibrated resistance adapted to be connected across said first conductor and said apparatus, a third conductor adapted to be connected at one end to the junction of said first conductor and said apparatus and having its other end movably connected to said calibrated resistance intermediate the ends thereof, a source of direct current connected in one of said second and third conductors, current detecting means connected in the other of said second and third conductors, a transformer having a primary winding adapted to be connected across said source of alternating current power, a first secondary winding in said first conductor in series with said variable resistance, a second secondary winding in said third conductor, said secondary windings being arranged to develop voltages thereacross respectively substantially equal to and *180 degrees out of* [in] phase with the voltage across said apparatus, and direct current blocking means connected in said circuit to block the direct current from traveling outside said circuit.

2. A circuit for measuring the temperature or resistance change of alternating current apparatus while connected across a source of alternating current power comprising a first conductor including a variable resistance adapted to be connected in series with said apparatus, a second conductor adapted to be connected across said first conductor and said apparatus, a calibrated resistance adapted to be connected across said first conductor and said apparatus, a third conductor adapted to be connected at one end to the junction of said first conductor and said apparatus and having its other end movably connected to said calibrated resistance intermediate the ends thereof, a source of direct current connected in said second conductor, current detecting means connected in said third conductor, a transformer having a primary winding adapted to be connected across said source of alternating current power, a first secondary winding in said first conductor in series with said variable resistance, a second secondary winding in said third conductor in series with said current detecting means, said secondary windings being arranged to develop voltages thereacross respectively substantially equal to and *180 degrees out of* [in] phase with the voltage across said apparatus, and direct current blocking means connected in said circuit to block the direct current from traveling outside said circuit.

3. A circuit for measuring the temperature of alternating current apparatus while connected across a source of alternating power comprising a first conductor including a variable resistance adapted to be connected in series with said apparatus, a second conductor adapted to be connected across said first conductor and said apparatus, a pair of resistances adapted respectively to be connected in series with said first conductor and said apparatus, a calibrated resistance adapted to be connected between said pair of resistances in series therewith, said pair of resistances being selected to provide for optimum calibration of said calibrated resistance, a third conductor adapted to be connected at one end to the junction of said first conductor and said apparatus and having its other end movably connected to said calibrated resistance intermediate the ends thereof, a source of direct current connected in one of said second and third conductors, current detecting means connected in the other of said second and third conductors, a transformer having a primary winding adapted to be connected across said source of alternating current power, a first secondary winding in said first conductor in series with said variable resistance, a second secondary winding in said third conductor, said secondary winding being arranged to develop voltages thereacross respectively substantially equal to and *180 degrees out of* [in] phase with the voltage across said apparatus, and direct current blocking means connected in said circuit to block the direct current from travelfing outside said circuit..

4. A circuit for measuring the temperature of alternating current apparatus while connected across a source of alternating current power comprising a first conductor including a variable resistance adapted to be connected in series with said apparatus, a second conductor adapted to be connected across said first conductor and said apparatus, a pair of resistances adapted respectively to be connected in series with said first conductor and said apparatus, a calibrated resistance adapted to be connected between said pair of resistances in series therewith, said pair of resistances being so selected as to provide for optimum calibration of said calibrated resistance, a third conductor adapted to be connected at one end to the junction of said first conductor and said apparatus and having its other end movably connected to said calibrated resistance intermediate the ends thereof, a source of direct current connected in said second conductor, current detecting means connected in said third conductor, a transformer having a primary winding adapted to be connected across said source of alternating current power, a first secondary winding in said conductor in series with said variable resistance, a second secondary winding in said third conductor in series with said current detecting means, said secondary windings being arranged to develop voltages thereacross respectively substantially equal to and *180 degrees out of* [in] phase with the voltage across said apparatus, and direct current blocking means connected in said circuit to block the direct current from traveling outside said circuit.

5. A circuit for measuring the temperature of alternating current apparatus while energized across a pair of lines connected across a source of alternating current power comprising a first conductor including a variable resistance adapted to be connected in series with said apparatus, a second conductor adapted to be connected across said first conductor and said apparatus, a pair of resistances adapted respectively to be connected in series with said first conductor and said apparatus, a calibrated resistance connected between said pair of resistances in series therewith, said pair of resistances being selected so as to provide optimum calibration of said calibrated resistance, a third conductor adapted to be connected at one end to the junction of said conductor and said apparatus and having its other end movably connected to said calibrated resistance intermediate the ends thereof, a source of direct current connected in one of said second and third conductors, current detecting means connected in the other of said second and third conductors, a transformer having a primary winding adapted to be connected across said source of alternating current power, a first secondary winding in said first conductor in series with said variable resistance, a second secondary winding in said third conductor, said secondary windings being arranged to develop voltages thereacross respectively substantially equal to and *180 degrees out of* [in] phase with the voltage across said apparatus, and a capacitor adapted to be connected in one of said alternating current lines between the connection to said transformer primary and the connection to said apparatus.

6. A circuit for measuring the temperature of alternating current apparatus while energized across a pair of lines connected across a source of alternating current power comprising a first conductor including a variable resistance adapted to be connected in series with said apparatus, a second conductor adapted to be connected across said first conductor and said apparatus, a pair of resistances respectively adapted to be connected in series with said first conductor and said apparatus, a calibrated resistance adapted to be connected between said pair of resistances in series therewith, said pair of resistances being selected so as to provide optimum calibration of said calibrated resistance, a third conductor adapted to be connected at one end to the junction of said first conductor and said apparatus and having its other end movably connected to said calibrated resistance intermediate the ends thereof, a battery connected in said second conductor, a galvanometer connected in said third conductor, a transformer having a primary winding adapted to be connected across said source of alternating current power, a first secondary winding in said first conductor in series with said variable resistance, a second secondary winding in said third conductor in series with said galvanometer, said secondary windings being arranged to develop voltages thereacross respectively substantially equal to and *180 degrees out of* [in] phase with the voltage across said apparatus, and a capacitor adapted to be connected in one of the alternating current lines between the connection to said transformer primary winding and the connection to said apparatus.

References Cited in the file of this patent or the original patent

UNITED STATES PATENTS

| | | |
|---|---|---|
| 1,665,397 | Wunsch | Apr. 10, 1928 |
| 2,578,455 | Seely | Dec. 11, 1951 |
| 2,657,353 | Sink | Oct. 27, 1953 |